(12) United States Patent
Heo et al.

(10) Patent No.: US 12,166,234 B2
(45) Date of Patent: Dec. 10, 2024

(54) SEPARATOR, LITHIUM SECONDARY BATTERY INCLUDING SEPARATOR, AND MANUFACTURING METHOD THEREFOR

(71) Applicant: LG ENERGY SOLUTION, LTD., Seoul (KR)

(72) Inventors: Jin-Woo Heo, Daejeon (KR); Hye-Jin Kwon, Daejeon (KR); Jong-Heon Kwak, Daejeon (KR); Sang-Ha Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 466 days.

(21) Appl. No.: 17/764,248

(22) PCT Filed: Oct. 22, 2020

(86) PCT No.: PCT/KR2020/014522
§ 371 (c)(1),
(2) Date: Mar. 28, 2022

(87) PCT Pub. No.: WO2021/085936
PCT Pub. Date: May 6, 2021

(65) Prior Publication Data
US 2022/0393300 A1    Dec. 8, 2022

(30) Foreign Application Priority Data
Nov. 1, 2019    (KR) .................. 10-2019-0138819

(51) Int. Cl.
*H01M 50/426*    (2021.01)
*C08F 293/00*    (2006.01)
(Continued)

(52) U.S. Cl.
CPC ....... *H01M 50/426* (2021.01); *C08F 293/005* (2013.01); *H01M 10/0525* (2013.01);
(Continued)

(58) Field of Classification Search
CPC .......... H01M 10/0525; H01M 50/403; H01M 50/417; H01M 50/426; H01M 50/431;
(Continued)

(56) References Cited

U.S. PATENT DOCUMENTS

2003/0215704 A1    11/2003    Satsuma et al.
2010/0310880 A1    12/2010    Register et al.
(Continued)

FOREIGN PATENT DOCUMENTS

CN    101507020 A    8/2009
EP    2 830 125 A1    1/2015
(Continued)

OTHER PUBLICATIONS

International Search Report (PCT/ISA/210) issued in PCT/KR2020/014522 mailed on Jan. 27, 2021.

*Primary Examiner* — Victoria H Lynch
(74) *Attorney, Agent, or Firm* — Birch, Stewart, Kolasch & Birch, LLP (57) ABSTRACT

A separator for a lithium secondary battery, including: a porous polymer substrate; and a crosslinked porous coating layer on at least one surface of the porous polymer substrate. The crosslinked porous coating layer includes inorganic particles and a crosslinkable binder polymer crosslinked through urethane crosslinking. The separator has improved heat resistance as compared to the conventional separators and maintains adhesion to an electrode. A lithium secondary battery including the separator is also disclosed.

16 Claims, 1 Drawing Sheet

(51) Int. Cl.
*H01M 10/0525* (2010.01)
*H01M 50/403* (2021.01)
*H01M 50/446* (2021.01)
*H01M 50/449* (2021.01)

(52) U.S. Cl.
CPC ....... *H01M 50/403* (2021.01); *H01M 50/446* (2021.01); *H01M 50/449* (2021.01); *C08F 2438/01* (2013.01)

(58) Field of Classification Search
CPC ............. H01M 50/446; H01M 50/449; H01M 50/451; H01M 50/491; Y02E 60/10
See application file for complete search history.

(56) References Cited

U.S. PATENT DOCUMENTS

| | | |
|---|---|---|
| 2014/0186680 A1 | 7/2014 | Kim et al. |
| 2014/0308565 A1 | 10/2014 | Lee et al. |
| 2017/0179456 A1 | 6/2017 | Kim et al. |
| 2018/0212219 A1 | 7/2018 | Kim et al. |
| 2018/0277815 A1 | 9/2018 | Sung et al. |

FOREIGN PATENT DOCUMENTS

| | | |
|---|---|---|
| JP | 2004-335210 A | 11/2004 |
| KR | 10-2009-0055439 A | 6/2009 |
| KR | 10-0923375 B1 | 10/2009 |
| KR | 10-2010-0038293 A | 4/2010 |
| KR | 10-2013-0093977 A | 8/2013 |
| KR | 10-2014-0044757 A | 4/2014 |
| KR | 10-2014-0124322 A | 10/2014 |
| KR | 10-2014-0147742 A | 12/2014 |
| KR | 10-2015-0084116 A | 7/2015 |
| KR | 19-2016-0128726 A | 11/2016 |
| KR | 10-2017-0007210 A | 1/2017 |
| KR | 10-2017-0127256 A | 11/2017 |
| KR | 10-1880237 B1 | 8/2018 |
| KR | 10-1904296 B1 | 11/2018 |
| KR | 19-2019-0006586 A | 1/2019 |

SEPARATOR, LITHIUM SECONDARY BATTERY INCLUDING SEPARATOR, AND MANUFACTURING METHOD THEREFOR

TECHNICAL FIELD

The present disclosure relates to a separator applicable to an electrochemical device, such as a lithium secondary battery, an electrochemical device including the same, and a method for manufacturing the same.

The present application claims priority to Korean Patent Application No. 10-2019-0138819 filed on Nov. 1, 2019 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although electrochemical devices, such as lithium secondary batteries, have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous polymer substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator including a porous coating layer formed by coating a mixture of inorganic particles with a binder polymer on at least one surface of a porous polymer substrate having a plurality of pores.

However, when using a binder polymer in such a porous coating layer, there is a problem in that heat shrinking occurs in the porous coating layer.

DISCLOSURE

Technical Problem

The present disclosure is designed to solve the problems of the related art, and therefore the present disclosure is directed to providing a separator which has improved heat resistance as compared to the conventional separators and shows adhesion to an electrode equivalent or similar to the adhesion of the conventional separators to an electrode, and a lithium secondary battery including the separator.

The present disclosure is also directed to providing a method for manufacturing the lithium secondary battery.

Technical Solution

In one aspect of the present disclosure, there is provided a separator for a lithium secondary battery according to any one of the following embodiments.

According to the first embodiment of the present disclosure, there is provided a separator for a lithium secondary battery, including:
  a porous polymer substrate; and
  a crosslinked porous coating layer on at least one surface of the porous polymer substrate, and the crosslinked porous coating layer includes inorganic particles and a crosslinkable binder polymer crosslinked through urethane crosslinking,
  wherein the inorganic particles include at least one hydroxyl group or the surfaces of the inorganic particles are treated with hydroxyl groups, and
  the crosslinkable binder polymer includes a homopolymer including repeating units of polyvinylidene fluoride-containing monomer containing at least one acrylate ($CH_2$=CHCOO—) group and a homopolymer including repeating units of an acrylate monomer containing at least one isocyanate (—NCO) group.

According to the second embodiment of the present disclosure, there is provided the separator for a lithium secondary battery as defined in the first embodiment, wherein the crosslinkable binder polymer is formed by grafting of a polyvinylidene fluoride-based polymer with a crosslinking agent including repeating units derived from an acrylate monomer containing at least one isocyanate (—NCO) group and a reactive resin including repeating units derived from an acrylate ($CH_2$=CHCOO—) group-containing polyvinylidene fluoride-based monomer.

According to the third embodiment of the present disclosure, there is provided the separator for a lithium secondary battery as defined in the first or the second embodiment, wherein the crosslinkable binder polymer is formed by grafting of a polyvinylidene fluoride-based polymer, a homopolymer including repeating units derived from an acrylate group-containing polyvinylidene fluoride monomer on the backbone of the polyvinylidene fluoride-based polymer, and a homopolymer including repeating units derived from an isocyanate group-containing acrylate monomer on the backbone of the polyvinylidene fluoride-based polymer.

According to the fourth embodiment of the present disclosure, there is provided the separator for a lithium secondary battery as defined in any one of the first to the third embodiments, wherein the polyvinylidene fluoride-containing polymer includes a copolymer of vinylidene difluoride (VDF) as a monomer with at least one comonomer selected from hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluoromethyl vinyl ether (PMVE), perfluoro-2,2-dimethyl-1,3-dioxole (PDD), and perfluoro-2-methylene-4-methyl-1,3-dioxolane (PMD).

According to the fifth embodiment of the present disclosure, there is provided the separator for a lithium secondary battery as defined in any one of the first to the fourth embodiments, wherein the homopolymer including repeating units of the acrylate ($CH_2$=CHCOO—) group-containing polyvinylidene fluoride-containing monomer is represented by the following Chemical Formula 1:

[Chemical Formula 1]

wherein each of n1 and n2 is an integer of 1 or more, and $R_1$ represents a $C_1$-$C_{10}$ alkyl group, a $C_1$-$C_{10}$ alkoxy group, or a $C_1$-$C_{10}$ alkyl group containing at least one double bond.

According to the sixth embodiment of the present disclosure, there is provided the separator for a lithium secondary battery as defined in any one of the first to the fifth embodiments, wherein the homopolymer including repeating units derived from an isocyanate (—NCO) group-containing acrylate monomer is represented by the following Chemical Formula 2:

wherein each of n3 and n4 is an integer of 1 or more.

According to the seventh embodiment of the present disclosure, there is provided the separator for a lithium secondary battery as defined in any one of the first to the sixth embodiments, wherein the crosslinkable binder polymer includes a binder polymer represented by the following Chemical Formula 3:

[Chemical Formula 3]

wherein each of n1, n2, n3 and n4 is an integer of 1 or more, and $R_1$ represents a $C_1$-$C_{10}$ alkyl group, a $C_1$-$C_{10}$ alkoxy group, or a $C_1$-$C_{10}$ alkyl group containing at least one double bond.

According to the eighth embodiment of the present disclosure, there is provided the separator for a lithium secondary battery as defined in the second embodiment, wherein the reactive resin including repeating units derived from an acrylate ($CH_2$=CHCOO—) group-containing polyvinylidene fluoride-based monomer is derived from at least one selected from ethyl acrylate, butyl acrylate, methyl methacrylate and 2-ethylhexyl acrylate.

According to the ninth embodiment of the present disclosure, there is provided the separator for a lithium secondary battery as defined in any one of the first to the eighth embodiments, wherein the inorganic particles and the crosslinkable binder polymer are crosslinked by a urethane reaction during an activation of a lithium secondary battery.

According to the tenth embodiment of the present disclosure, there is provided the separator for a lithium secondary battery as defined in any one of the first to the ninth embodiments, wherein an amount of the isocyanate group is larger than 0 and equal to or less than 100 parts by weight based on 100 parts by weight of the crosslinkable binder polymer.

According to the eleventh embodiment of the present disclosure, there is provided the separator for a lithium secondary battery as defined in any one of the first to the tenth embodiments, wherein the inorganic particles have an average particle diameter ($D_{50}$) of 0.001-10 μm.

In another aspect of the present disclosure, there is provided a lithium secondary battery according to the following embodiment.

According to the twelfth embodiment of the present disclosure, there is provided a lithium secondary battery including a cathode, an anode and a separator interposed between the cathode and the anode, wherein the separator is the same as defined in any one of the first to the eleventh embodiments.

In still another aspect of the present disclosure, there is provided a method for manufacturing a lithium secondary battery according to any one of the following embodiments.

According to the thirteenth embodiment of the present disclosure, there is provided a method for manufacturing a lithium secondary battery, including the steps of:

(S1) preparing a slurry including (a) inorganic particles containing at least one hydroxyl group or inorganic particles surface-treated with hydroxyl groups, (b) a crosslinkable binder polymer which includes a homopolymer including repeating units of a polyvinylidene fluoride-containing monomer containing at least one acrylate ($CH_2$=CHCOO—) group and a homopolymer including repeating units derived from an acrylate monomer containing at least one isocyanate (—NCO) group, and (c) a solvent;

(S2) applying the slurry on a porous polymer substrate, followed by drying, to prepare a preliminary separator having a porous coating layer on the porous polymer substrate;

(S3) manufacturing a battery including the preliminary separator; and (S4) activating the battery, wherein the inorganic particles and the crosslinkable binder polymer containing isocyanate and acrylate groups undergo a crosslinking reaction during the activation step to form urethane crosslinking.

According to the fourteenth embodiment of the present disclosure, there is provided the method for manufacturing a lithium secondary battery as defined in the thirteenth embodiment, wherein step (S4) includes aging the battery at a temperature of 50° C.

According to the fifteenth embodiment of the present disclosure, there is provided the method for manufacturing a lithium secondary battery as defined in the thirteenth or the fourteenth embodiment, wherein the crosslinkable binder polymer is formed by grafting of a polyvinylidene fluoride-based polymer with a crosslinking agent including repeating units derived from an acrylate monomer containing at least one isocyanate (—NCO) group and a reactive resin including repeating units derived from an acrylate ($CH_2$=CHCOO—) group-containing polyvinylidene fluoride-based monomer.

Advantageous Effects

According to an embodiment of the present disclosure, the crosslinkable binder polymer is crosslinked with the inorganic particles in the porous coating layer. Therefore, it is possible to provide a separator having chemically stronger bonds as compared to the conventional non-crosslinked porous coating layers, and a lithium secondary battery including the separator.

It is also possible to provide a separator having improved heat resistance by virtue of the crosslinking, and a lithium secondary battery including the separator.

Meanwhile, the crosslinking is carried out in the initial charging step of the battery, and may be formed by aging the battery at high temperature with no additional step. Therefore, strong bonds are formed between the inorganic particles and the crosslinkable binder polymer in the porous coating layer, thereby providing a separator having improved heat resistance. In other words, the coating layer including a crosslinked polymer according to the related art is mostly formed by applying slurry containing the crosslinkable polymer onto at least one surface of a porous polymer substrate and carrying out an additional step (heat treatment, UV irradiation, etc.) to allow crosslinking of the crosslinkable polymer. However, according to an embodiment of the present disclosure, urethane crosslinking may be carried out between the crosslinkable binder polymer and the inorganic particles through the aging step performed during the manufacture of the battery without any additional step for such crosslinking.

Meanwhile, according to an embodiment of the present disclosure, the crosslinkable binder polymer includes an acrylate group in a polyvinylidene fluoride-based monomer. Therefore, it is possible to prevent the monomers in the porous coating layer from being dissolved by an electrolyte, after the impregnation with the electrolyte.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

Hereinafter, the present disclosure will be explained in detail.

In an electrochemical device, such as a lithium secondary battery, a separator generally uses a porous polymer substrate and is problematic in that it shows a heat shrinking behavior. Therefore, a porous coating layer has been introduced to a separator to reduce the heat shrinkage of the separator.

However, use of a binder polymer in the porous coating layer causes a problem of heat shrinking in the porous coating layer.\

The inventors of the present disclosure have focused on the above-mentioned problem and have conducted intensive studies about a separator which ensures the heat resistance of its porous coating layer and maintains adhesion to an electrode, even after carrying out an aging step at high temperature, thereby finishing the present disclosure.

In other words, according to the present disclosure, there is provided a separator including a porous coating layer provided with reinforced heat resistance and improved safety during high-temperature aging, and showing adhesion to an electrode equivalent to or similar to the adhesion of the conventional separators. There is also provided a lithium secondary battery including the separator.

In one aspect of the present disclosure, there is provided a separator for a lithium secondary battery, including:
a porous polymer substrate; and
a crosslinked porous coating layer formed on at least one surface of the porous polymer substrate, and including inorganic particles and a crosslinkable binder polymer crosslinked with each other through urethane crosslinking,
wherein the inorganic particles include at least one hydroxyl group or the surfaces of the inorganic particles are treated with hydroxyl groups, and
the crosslinkable binder polymer includes a homopolymer including repeating units derived from a polyvinylidene fluoride-based monomer containing at least one acrylate ($CH_2$=CHCOO—) group and a homopolymer including repeating units derived from an acrylate monomer containing at least one isocyanate (—NCO) group.

Figure 2:
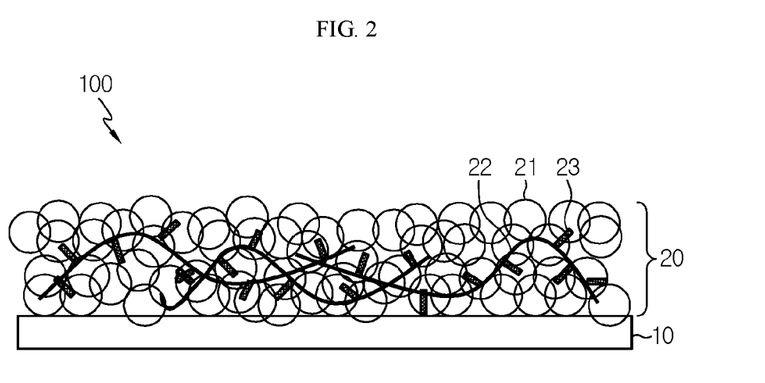
FIG. 2 is a schematic sectional view illustrating the separator for a lithium secondary battery according to an embodiment of the present disclosure.

According to an embodiment of the present disclosure, the inorganic particles and the crosslinkable binder polymer form urethane crosslinking in the separator. This is shown schematically in FIG. 2. Referring to FIG. 2, the separator 100 according to an embodiment of the present disclosure includes a porous polymer substrate 10 and a crosslinked porous coating layer 20 disposed on at least one surface of the porous polymer substrate. Herein, the crosslinked porous coating layer 20 includes inorganic particles 21 and a crosslinkable binder polymer 22, wherein the inorganic particles 21 and the crosslinkable binder polymer 22 form urethane crosslinking 23 therebetween.

Particularly, the hydroxyl (—OH) groups of the inorganic particles are bound with the isocyanate (—NCO) groups of the crosslinkable binder polymer.

Herein, the crosslinkable binder polymer has an isocyanate (—NCO) group and includes a fluorinated binder polymer having an acrylate ($CH_2$=CHCOO—) group.

For example, the crosslinkable binder polymer is formed by grafting of a polyvinylidene fluoride-based polymer with a crosslinking agent including repeating units derived from an acrylate monomer containing at least one isocyanate (—NCO) group and a reactive resin including repeating units derived from an acrylate ($CH_2$=CHCOO—) group-containing polyvinylidene fluoride-based monomer. In other words, the crosslinkable binder polymer has at least one isocyanate (—NCO) group, and includes a fluorine-based binder polymer having reactive groups including at least one acrylate ($CH_2$=CHCOO—) group.

According to an embodiment of the present disclosure, the crosslinkable binder polymer is formed by grafting of a polyvinylidene fluoride-based polymer, a homopolymer including repeating units derived from an acrylate group-containing polyvinylidene fluoride monomer on the backbone of the polyvinylidene fluoride-based polymer, and a homopolymer including repeating units derived from an isocyanate group-containing acrylate monomer on the backbone of the polyvinylidene fluoride-based polymer.

According to an embodiment of the present disclosure, the crosslinkable binder polymer includes a polyvinylidene fluoride-based polymer. Such a polyvinylidene fluoride-based polymer may include a polyvinylidene fluoride (PVDF)-based polymer resin containing vinylidene fluoride (VDF) as a monomer. The PVDF-based polymer resin may include polyvinylidene fluoride. In addition, the PVDF-based polymer resin may include a copolymer of vinylidene difluoride (VDF) as a monomer with at least one comonomer selected from hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluoromethyl vinyl ether (PMVE), perfluoro-2,2-dimethyl-1,3-dioxole (PDD), and perfluoro-2-methylene-4-methyl-1,3-dioxolane (PMD). Particularly, the comonomer may include hexafluoropropylene (HFP), chlorotrifluoroethylene (CTFE) or both. In the PVDF-based polymer resin, the content of the comonomer is not particularly limited, as long as it ranges from 3 wt % to 50 wt %, based on the total weight of the PVDF-based polymer resin. For example, the content of the comonomer may be 5 wt % or less, and may be present in an amount of 30 wt % or less, 15 wt % or less, 12 wt % or less, or 10 wt % or less.

According to an embodiment of the present disclosure, the PVDF-based polymer resin may include any one selected from the group consisting of polyvinylidene fluoride, polyvinylidene fluoride-co-hexafluoropropylene, polyvinylidene fluoride-co-trichloroethylene, polyvinylidene fluoride-tetrafluoroethylene, polyvinylidene fluoride-co-trifluoroethylene, polyvinylidene fluoride-co-trifluorochloroethylene and polyvinylidene fluoride-co-ethylene, or a mixture of two or more of them.

According to an embodiment of the present disclosure, the homopolymer including repeating units derived from an acrylate ($CH_2$=CHCOO—) group-containing polyvinylidene fluoride-based monomer is represented by the following Chemical Formula 1:

[Chemical Formula 1]

wherein each of n1 and n2 is an integer of 1 or more, and $R_1$ represents a C1-C10 alkyl group, a C1-C10 alkoxy group, or a C1-C10 alkyl group containing at least one double bond.

Herein, the polyvinylidene fluoride-based monomer refers to both polyvinylidene fluoride homopolymer and polyvinylidene fluoride copolymer. For example, the polyvinylidene fluoride copolymer is a resin formed by copolymerization of vinylidene fluoride with a comonomer at a weight ratio of 50:50-99:1, wherein the comonomer may include vinyl fluoride, trifluoroethylene, chlorofluoroethylene, trichloroethylene, 1,2-difluoroethylene, tetrafluoroethylene, hexafluoropropylene, perfluoro(alkylvinyl)ether, perfluoro(1,3-dioxole), perfluoro(2,2-dimethyl-1,3-dioxole), or two or more of them. Non-limiting examples of the polyvinylidene fluoride copolymer include polyvinylidene fluoride-co-hexafluoropropylene, polyvinylidene fluoride-co-trichloroethylene, polyvinylidene fluoride-co-trifluoroethylene, or the like.

Herein, the acrylate group-containing reactive resin or acrylate group-containing homopolymer refers an alkyl group-containing acrylate monomer. Particular examples of such a monomer include, but are not limited to: methyl (meth)acrylate, ethyl (meth)acrylate, hexyl (meth)acrylate, n-propyl (meth)acrylate, isopropyl (meth)acrylate, n-butyl (meth)acrylate, t-butyl (meth)acrylate, sec-butyl (meth)

acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate, lauryl (meth)acrylate, or the like.

According to an embodiment of the present disclosure, the homopolymer including repeating units derived from an isocyanate (—NCO) group-containing acrylate monomer is represented by the following Chemical Formula 2:

[Chemical Formula 2]

wherein each of n3 and n4 is an integer of 1 or more.

The homopolymer including repeating units derived from an isocyanate (—NCO) group-containing acrylate monomer may include an aliphatic isocyanatoalkyl (meth)acrylate, such as 2-isocyanatoethyl (meth)acrylate, isocyanatomethyl (meth)acrylate, 2-isocyanatopropyl (meth)acrylate, 3-isocyanatopropyl (meth)acrylate, or the like.

Particular examples of the acrylate monomer containing a cyano group, an amino group, an amide group, or two or more functional groups of them include, but are not limited to: cyano group-containing monomers, such as acrylonitrile or methacrylonitrile; amide group-containing monomers, such as (meth)acrylamide, N,N-dimethyl (meth)acrylamide, N,N-diethyl (meth)acrylamide, N-isopropyl (meth)acrylamide, N-methylol (meth)acrylamide, diacetone (meth)acrylamide, N-vinyl acetamide, N,N'-methylene bis(meth)acrylamide, N,N-dimethylaminopropyl (meth)acrylamide, N,N-dimethylaminopropyl methacrylamide, N-vinyl pyrrolidone, N-vinyl caprolactam, or (meth)acryloyl morpholine; amino group-containing monomers, such as aminoethyl (meth)acrylate, N,N-dimethylaminoethyl (meth)acrylate or N,N-dimethylaminopropyl (meth)acrylate; and imide group-containing monomers, such as N-isopropyl maleimide, N-cyclohexyl maleimide or itaconic imide.

Particular examples of the acrylate monomer containing a fluoro group include perfluoroethyl (meth)acrylate, perfluoromethyl (meth)acrylate, 2,2,2-trifluoroethyl (meth)acrylate, 2,2,3,3-tetrafluoropropyl (meth)acrylate, 1H, 1H, 5H-octafluoropentyl (meth)acrylate, 1H, 1H, 2H, 2H-tridecafluorooctyl (meth)acrylate, or the like.

Herein, the content of the isocyanate group may be larger than 0 and equal to or less than 100 parts by weight, 1-70 parts by weight, or 1-50 parts by weight, based on 100 parts by weight of the crosslinkable binder polymer. When the content of the isocyanate group is increased, the number of urethane crosslinking between the binder polymer and the inorganic particles is increased, thereby forming a stronger porous coating layer. As a result, a separator having improved heat resistance can be obtained.

Meanwhile, according to an embodiment of the present disclosure, the crosslinkable binder polymer may include a binder polymer represented by the following Chemical Formula 3:

[Chemical Formula 3]

wherein each of n1, n2, n3 and n4 is an integer of 1 or more, and $R_1$ represents a C1-C10 alkyl group, a C1-C10 alkoxy group, or a C1-C10 alkyl group containing at least one double bond.

According to an embodiment of the present disclosure, the binder polymer may further include a non-crosslinkable fluorinated copolymer.

For example, the non-crosslinkable fluorinated copolymer may include any one selected from polyvinylidene fluoride, polyvinylidene fluoride-co-hexafluoropropylene, polyvinylidene fluoride-co-trifluoroethylene, polyvinylidene fluoride-co-chlorotrifluoroethylene, and polyvinylidene fluoride-co-tetrafluoroethylene, or two or more of them.

According to an embodiment of the present disclosure, the crosslinkable binder polymer may have a weight average molecular weight of 300,000-2,000,000, or 500,000-1,800,000.

When the weight average molecular weight of the crosslinkable binder polymer satisfies the above-defined range, slurry prepared by blending the crosslinkable binder polymer with inorganic particles shows a low sedimentation rate to provide excellent slurry stability, and coating uniformity is improved, when a porous polymer substrate is coated with inorganic particles. In addition, it is possible to solve the problems of detachment of the porous coating layer from the porous polymer substrate and degradation of the heat shrinkage of the separator, caused by dissolution of the crosslinkable binder polymer in an electrolyte upon crosslinking, resulting in a failure in sufficient interconnection and fixing of the inorganic particles. Further, it is possible to prevent a short-circuit.

According to an embodiment of the present disclosure, the inorganic particles may include at least one hydroxyl group or may be surface-treated with hydroxyl groups.

Herein, the inorganic particles containing at least one hydroxyl group may include aluminum hydroxide, magnesium hydroxide or boehmite.

Herein, the inorganic particles surface-treated with hydroxyl groups are not limited in terms of the type of inorganic particles, and any inorganic particles used conventionally in the art may be used. Non-limiting examples of the inorganic particles include any one selected from the group consisting of $Al_2O_3$, $SiO_2$, $ZrO_2$, $TiO_2$, $BaTiO_3$, $Pb(Zr_xTi_{1-x})O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/3}Nb_{2/3})O_3$-$xPbTiO_3$ (PMN-PT, wherein 0<x<1), hafnia ($HfO_2$), $SrTiO_3$, $SnO_2$, $CeO_2$, MgO, NiO, CaO, ZnO, $ZO_3$ and SiC, or a mixture of two or more of them. Such inorganic particles may be used alone or in combination.

The inorganic particles may have an average particle diameter ($D_{50}$) of 0.001-10 μm, 1-700 nm, or 20-500 nm, with a view to formation of a porous coating layer having a uniform thickness and suitable porosity.

Particularly, according to an embodiment of the present disclosure, when the inorganic particles have an average particle diameter of 0.001-10 µm, it is possible to form strong urethane crosslinking with the binder polymer.

Herein, particular examples of the method for surface-treating the inorganic particles with hydroxyl groups include corona treatment of inorganic particles for providing surface-treated inorganic particles. For example, commercially available inorganic particles surface-treated with hydroxyl groups may be used.

According to an embodiment of the present disclosure, the weight ratio of the inorganic particles to the binder polymer may be 90:10-60:40. When the weight ratio of the inorganic particles to the binder polymer satisfies the above-defined range, it is possible to prevent the problem of a decrease in pore size and porosity of the resultant porous coating layer, caused by an increase in content of the binder polymer. It is also possible to solve the problem of degradation of peeling resistance of the resultant porous coating layer, caused by a decrease in content of the binder polymer.

In addition, the slurry for forming a porous coating layer may further include a binder polymer having adhesive properties and used conventionally in the art, besides the above-described fluorinated binder polymer. As used herein, the binder polymer means a non-crosslinkable binder polymer rather than a crosslinkable binder polymer.

Particular examples of such a binder polymer include any one selected from the group consisting of polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalchol, cyanoethyl cellulose, cyanoethyl sucrose, pullulan, and carboxymethyl cellulose, or a mixture of two or more of them.

According to an embodiment of the present disclosure, the porous coating layer has a thickness of 1-15 µm, particularly 1.5-5 µm, based on single side coating. Also, the porosity of the porous coating layer is not particularly limited, but the porous coating layer may have a porosity of 35-85% preferably.

The separator according to an embodiment of the present disclosure may further include other additives besides the above-described inorganic particles and binder polymer as ingredients of the porous separator layer.

According to an embodiment of the present disclosure, the crosslinkable binder polymer of the porous coating layer attaches the inorganic particles to one another (i.e. the crosslinkable binder polymer interconnects and fix the inorganic particles) so that they may retain their binding states. In addition, the inorganic particles and the porous polymer substrate are retained in such a manner that they may be bound to each other by the crosslinkable binder polymer. The inorganic particles of the porous coating layer may form interstitial volumes, while they are substantially in contact with one another, wherein the interstitial volumes refer to spaces defined by the inorganic particles that are substantially in contact with one another in a closely packed or densely packed structure of the inorganic particles. The interstitial volumes formed among the inorganic particles may become vacant spaces to form pores.

According to an embodiment of the present disclosure, the separator may have a heat shrinkage of 30% or less, 1-27%, or 1-25%.

Herein, each of the heat shrinkage of the separator before crosslinking and that of the separator (finished separator) after an aging step can be obtained by preparing a separator specimen having a size of 5 cm×5 cm, storing the specimen at 150° C. for 30 minutes, and calculating the heat shrinkage according to the formula of [((Initial length)−(Length after heat shrinking at 150° C./30 min.))/(Initial length)]×100. The heat shrinkage of the separator after an aging step may be determined by preparing a crosslinked separator after storing a separator before crosslinking under the same battery activation condition without a step of assemblage with electrodes, and calculating the heat shrinkage of the obtained finished crosslinked separator under the same condition as described above.

Particularly, the porous polymer substrate may be a porous polymer film substrate or porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-150° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the porous polymer substrate, the porous polymer substrate may have a thickness of 1-100 µm, particularly 5-50 µm. In addition, although there is no particular limitation in the size of the pores present in the porous polymer substrate and porosity, the pore size and porosity may be 0.01-50 µm and 20-75%, respectively.

Figure 1:
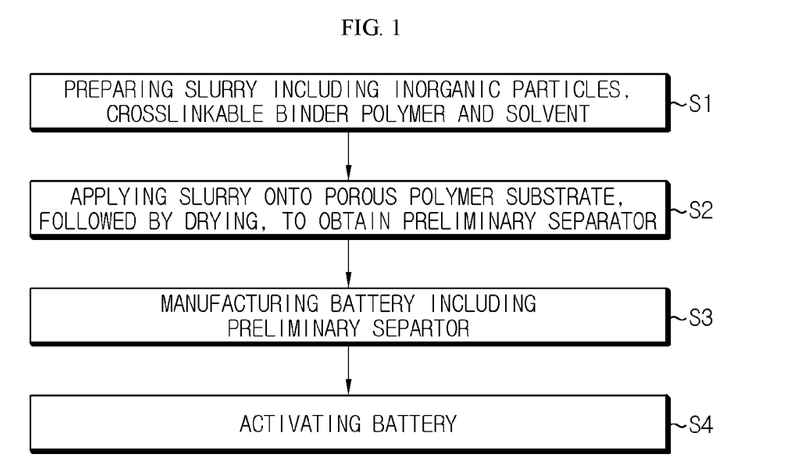
FIG. 1 is a flow chart illustrating the method for manufacturing a lithium secondary battery according to an embodiment of the present disclosure.

FIG. 1 is a flow chart illustrating the method for manufacturing a lithium secondary battery according to an embodiment of the present disclosure.

According to an embodiment of the present disclosure, a lithium secondary battery may be obtained by the method described hereinafter.

Particularly, the method includes the steps of:
(S1) preparing slurry for forming a porous coating layer including inorganic particles containing at least one hydroxyl group or surface-treated with hydroxyl groups, a crosslinkable binder polymer which includes a homopolymer including repeating units derived from a polyvinylidene fluoride-based monomer containing at least one acrylate ($CH_2$=CHCOO—) group and a homopolymer including repeating units derived from an acrylate monomer containing at least one isocyanate (—NCO) group, and a solvent;

(S2) applying the slurry for forming a porous coating layer on a porous polymer substrate, followed by drying, to prepare a preliminary separator having a porous coating layer formed on the porous polymer substrate;

(S3) manufacturing a battery including the preliminary separator; and (S4) activating the battery, wherein the inorganic particles and the crosslinkable binder polymer containing isocyanate and acrylate groups undergo a crosslinking reaction during the activation step to form urethane crosslinking.

In the method for improving the safety of a lithium secondary battery according to the related art, inorganic particles are coated on a separator to improve the heat resistance of the separator, wherein a highly heat resistant binder polymer is used to further improve the heat resistance upon the coating. Herein, when a crosslinkable polymer is used as a highly heat resistant binder, an additional crosslinking step is required, processing costs are increased, and the porous coating layer formed on the separator after the crosslinking becomes hard. As a result, there is a difficulty in adhering the separator to an electrode during the subsequent step of forming an electrode assembly.

To solve such a difficulty, according to the present disclosure, a preliminarily crosslinked polymer is not introduced to the porous coating layer of a separator, but a separator is manufactured by introducing a crosslinkable binder polymer corresponding to a precursor before crosslinking to a separator, an electrode assembly is formed to assemble a secondary battery, and then an aging step (e.g. 60° C., 12 hours) is carried out so that the crosslinkable binder polymer may be crosslinked completely. Herein, in order to complete crosslinking during the aging step, a crosslinkable binder polymer capable of urethane crosslinking and reacting at a low temperature condition may be used, and a crosslinkable binder polymer, not a crosslinkable monomer, is used so that the porous coating layer may not dissolved in an electrolyte before crosslinking.

Each step will be explained in detail hereinafter.

First, a crosslinkable binder polymer and a dispersant are dissolved in a solvent, and inorganic particles are added thereto and dispersed therein to prepare slurry for forming a crosslinkable porous coating layer. The inorganic particles may be added, after they are pulverized to a predetermined average particle diameter. Otherwise, the inorganic particles are added to a solvent, and then dispersed in the solvent, while being controlled to have a predetermined particle diameter by using a ball milling process, or the like. Herein, the inorganic particles include at least one hydroxyl group or the surfaces of the inorganic particles are treated with hydroxyl groups. In addition, the crosslinkable binder polymer includes a homopolymer including repeating units derived from a polyvinylidene fluoride-based monomer containing at least one acrylate ($CH_2$=CHCOO—) group and a homopolymer including repeating units derived from an acrylate monomer containing at least one isocyanate (—NCO) group.

Although there is no particular limitation in the process for coating the slurry onto the porous polymer substrate, a slot coating or dip coating process may be used. A slot coating process includes coating slurry supplied through a slot die onto the whole surface of a substrate and is capable of controlling the thickness of a coating layer depending on the flux supplied from a metering pump. In addition, a dip coating process includes dipping a substrate into a tank containing a composition to carry out coating and is capable of controlling the thickness of a coating layer depending on the concentration of the slurry and the rate of removing the slurry from the tank. Further, in order to control the coating thickness more precisely, it is possible to carry out post-metering through a Mayer bar or the like, after dipping.

Then, the porous polymer substrate coated with the slurry may be dried by using a dryer, such as an oven, thereby forming a porous coating layer on at least one surface of the porous polymer substrate.

Non-limiting examples of the solvent used herein may include any one selected from acetone, tetrahydrofuran, methylene chloride, chloroform, dimethyl formamide, N-methyl-2-pyrrolidone, methyl ethyl ketone, cyclohexane, methanol, ethanol, isopropyl alcohol, propanol and water, or a mixture of two or more of them.

After coating the slurry on the porous polymer substrate, the coated porous polymer substrate may be dried at 90-180° C. or 100-150° C. to remove the solvent.

In this manner, prepared is a preliminary separator including a porous polymer substrate, and a porous coating layer containing a crosslinkable binder polymer and inorganic particles and disposed on at least one surface of the porous polymer substrate.

The isocyanate group-containing crosslinkable binder polymer and the hydroxyl group-containing inorganic particles form urethane crosslinking through an urethane crosslinking reaction.

The crosslinkable binder polymer and the inorganic particles that may be used herein are the same as described above.

Then, an electrode including a current collector and an electrode layer disposed on at least one surface of the current collector is stacked on the top surface of the porous coating layer of the preliminary separator, and the electrode layer is allowed to be in contact with the porous coating layer, thereby preparing a preliminary separator-electrode composite.

The preliminary separator-electrode composite is introduced to a battery casing and an electrolyte is injected thereto to prepare a secondary battery.

A non-aqueous electrolyte is injected to the battery casing in which the preliminary separator-electrode composite is received, followed by sealing, and then the sealed preliminary battery may be subjected to an activation step of initially charging the battery in order to activate the electrode active material and to form an SEI film on the electrode surface. In addition, an aging step may be further carried out so that the electrolyte injected before the activation step may infiltrate into the electrode and the preliminary separator.

While the electrode active material is activated and an SEI film is formed in the above-described manner, gases may be generated in the battery through the decomposition of the electrolyte, or the like. As mentioned above, according to the related art, such gases generated during the initial charging step may be discharged to the outside of the battery by reopening the battery casing or by cutting a portion of the battery casing.

Herein, during the step of activating a secondary battery, the crosslinkable binder polymer of the porous coating layer is crosslinked with the hydroxyl group-containing inorganic particles to form urethane crosslinking.

According to an embodiment of the present disclosure, the step of activating a secondary battery may include an initial charging step and a high-temperature aging step, or an initial charging step, a room-temperature aging step and a high-temperature aging step.

The initial charging may be carried out at a state of charge (SOC) of 10% or more, 30% or more, or 50% or more. Although the upper limit of SOC is not particularly limited, it may be 100% or 90%. In addition, the initial charging may be carried out with a cut-off voltage of 3.5 V or more, 3.5-4.5 V, or 3.65-4.5 V.

The initial charging may be carried out at a C-rate of 0.05-2 C, or 0.1-2 C.

The high-temperature aging step functions to provide a condition under which the crosslinkable binder polymer of the porous coating layer may be crosslinked. For example, the high-temperature aging step may be carried out at a temperature of 50° C. or higher, 50-100° C., 60-100° C., or 60-80° C. The high-temperature aging step may be carried out for 0.5-2 days, or 0.5-1.5 days.

In addition, the room temperature-aging step may be added between the initial charging step and the high-temperature aging step, and may be carried out at a temperature of 20-40° C., 23-35° C., 23-30° C., 23-27° C., or 23-25° C. In addition, the room temperature-aging step may be carried out for 1-7 days, or 1-5 days.

According to an embodiment of the present disclosure, the step of activating a secondary battery may be carried out by charging the secondary battery under a constant current (CC) condition of 0.1 C to 3.65 V at SOC 30%, storing the secondary battery at room temperature (25° C.) for 3 days, and aging the secondary battery by storing it at a high temperature of 60° C. for 1 day.

In still another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Preparation Example

The binder polymer according to an embodiment of the present disclosure was obtained by the following method.

Particularly, a binder polymer was obtained by using PVDF-CTFE as a polyvinylidene fluoride-based polymer, a crosslinking agent including 2-isocyanatoethyl acrylate monomer, and a reactive resin including repeating units derived from methyl methacrylate monomer and repeating units derived from a polyvinylidene fluoride-based monomer (wherein the weight ratio of PVDF-CTFE: 2-isocyanatoethyl acrylate monomer: methyl methacrylate monomer was 14:19:7) through atomic transfer radical polymerization in acetone as a solvent at 55° C. under nitrogen at 150 rpm in the presence of V-65 as an initiator and a catalyst. As a result, PVDF-CTFE was grafted with 2-isocyanatoethyl acrylate monomer and methyl methacrylate monomer to provide a binder polymer. Herein, the reactive resin was introduced in order to control the crosslinking site density and grafting chain length.

[Manufacture of Separator]

Then, the resultant binder polymer and aluminum hydroxide $(Al(OH)_3)$ as inorganic particles were introduced to acetone as a solvent at a weight ratio of 30:70 to prepare slurry for forming a porous coating layer.

After that, the slurry for forming a porous coating layer was coated on both surfaces of a polyethylene porous membrane (porosity: 43%, air permeability: 110 sec, resistance 0.45 ohm,) having a thickness of 9 μm through a dip coating process and dried in an oven at 23° C. under a relative humidity of 40% to obtain a separator having porous coating layers.

[Manufacture of Lithium Secondary Battery]

Then, 96.7 parts by weight of Li[Ni$_{0.6}$Mn$_{0.2}$Co$_{0.2}$]O$_2$ functioning as a cathode active material, 1.3 parts by weight of graphite functioning as a conductive material and 2.0 parts by weight of polyvinylidene fluoride functioning as a binder were mixed to prepare a cathode mixture. The obtained cathode mixture was dispersed in 1-methyl-2-pyrrolidone functioning as a solvent to obtain cathode mixture slurry. The slurry was coated on both surfaces of aluminum foil having a thickness of 20 μm, followed by drying and pressing, to obtain a cathode.

In addition, 97.6 parts by weight of artificial graphite and natural graphite functioning as anode active materials (weight ratio 90:10), and 1.2 parts by weight of styrene-butadiene rubber (SBR) functioning as a binder and 1.2 parts by weight of carboxymethyl cellulose (CMC) were mixed to prepare an anode mixture. The anode mixture was dispersed in ion exchange water functioning as a solvent to prepare anode mixture slurry. The slurry was coated on both surfaces of copper foil having a thickness of 20 μm, followed by drying and pressing, to obtain an anode.

After that, LiPF$_6$ was dissolved in an organic solvent containing a mixture of ethylene carbonate (EC), propylene carbonate (PC) and diethyl carbonate (DEC) at a volume ratio of 3:3:4 to a concentration of 1.0 M, thereby providing a non-aqueous electrolyte.

The preliminary separator was interposed between the cathode and the anode in such a manner that at least one layer of the cathode active material layer and the anode active material layer might face the porous coating layer of the preliminary separator, thereby providing a preliminary separator-electrode composite. The preliminary separator-electrode composite was received in a pouch and the electrolyte was injected thereto to obtain a secondary battery.

Then, the secondary battery provided with the preliminary separator was charged under a constant current (CC) condition of 0.1 C to 3.65 V at SOC 30%, and then subjected to an activation step through an aging step of storing it at room temperature (25° C.) for 3 days and at a high temperature of 60° C. for 1 day.

During the activation step, the isocyanate groups contained in the porous coating layer of the preliminary separator and the hydroxyl groups of the inorganic particles reacted with each other through an addition reaction to perform urethane crosslinking, thereby forming a cross-linked porous coating layer.

As a result, a separator for a lithium secondary battery including the inorganic particles and the binder polymer crosslinked with each other through urethane bonding in the crosslinked porous coating layer, and a secondary battery including the separator were obtained finally.

Examples 2 and 3

Separators were obtained in the same manner as Example 1, except that the inorganic particles and the binder polymer were used as shown in the following Table 1.

Comparative Examples 1 and 2

Separators were obtained in the same manner as Example 1, except that the inorganic particles and the binder polymer were used as shown in the following Table 1.

Comparative Example 3

The inorganic particles and binder polymer having the same physical properties as Example 1 were used, but the high-temperature aging step was not carried out.

As a result, a separator including the inorganic particles and binder polymer but undergoing no urethane crosslinking was obtained.

TABLE 1

|  | Composition | High-temperature aging | Heat shrinkage of separator (MD/TD) | Adhesion of separator to electrode (Lami Strength) | Resistance of separator (ohm) | Air permeability of separator (sec/100 mL) |
| --- | --- | --- | --- | --- | --- | --- |
| Ex. 1 | Aluminum hydroxide (average particle diameter: 800 nm) + PVDF-HFP, crosslinkable binder polymer (3%) | ○ | 25/20 | 84 | 0.91 | 257 |
| Ex. 2 | Aluminum hydroxide (average particle diameter: 800 nm) + PVDF-HFP, crosslinkable binder polymer (6%) | ○ | 15/12 | 82 | 0.92 | 258 |
| Ex. 3 | Aluminum hydroxide (average particle diameter: | ○ | 1/1 | 83 | 0.94 | 263 |

TABLE 1-continued

|  | Composition | High-temperature aging | Heat shrinkage of separator (MD/TD) | Adhesion of separator to electrode (Lami Strength) | Resistance of separator (ohm) | Air permeability of separator (sec/100 mL) |
|---|---|---|---|---|---|---|
|  | 800 nm) + PVDF-HFP, crosslinkable binder polymer (15%) |  |  |  |  |  |
| Comp. Ex. 1 | Aluminum hydroxide + PVDF-HFP, (not including crosslinkable polymer) | ○ | 33/31 | 82 | 0.89 | 250 |
| Comp. Ex. 2 | Aluminum hydroxide + PVDF-HFP, crosslinkable binder polymer (3%) | X | 32/32 | 80 | 0.91 | 255 |

Test Examples

1) Method for Determination of Thickness

Each of the lithium secondary batteries according to Examples and Comparative Examples was disassembled again. The thickness of the resultant separator was determined by using a thickness gauge (Mitutoyo Co., VL-50S-B).

2) Method for Determination of Heat Shrinkage

Each of the heat shrinkage of a separator before crosslinking and that of a separator (finished separator) after an aging step was calculated by preparing a specimen of each separator into a size of 5 cm×5 cm, allowing each specimen to stand at 150° C. for 30 minutes, and then calculating the heat shrinkage according to the formula of Heat Shrinkage (%)=[(Initial length−Length after heat shrinking at 150° C. for 30 minutes)/(Initial length)]×100.

The heat shrinkage of a separator after an aging step was determined by preparing a crosslinked separator after storing a separator before crosslinking under the same battery activation condition without a step of assembling with electrodes, and then subjecting the obtained finished separator under the same condition as described above.

3) Method for Determining Adhesion (Lami Strength) between Electrode and Separator Each of the lithium secondary battery obtained from Examples and Comparative Examples was cut into a size of 25 mm×100 mm. Then, the lithium secondary battery was inserted between 100 μm PET films and adhered thereto by using a flat press. Herein, the flat press was heated and pressurized at 60° C. under a pressure of 1000 kgf. The obtained separator to which the anode was adhered was attached to slide glass by using a double-sided adhesive tape. Then, the end portion (10 mm or less from the end of the attached surface) of the attached surface of the separator was peeled and attached to a PET film with a size of 25 mm×100 mm by using a single-sided tape so that the end portion and the film might be linked to each other in the longitudinal direction. After that, slide glass was mounted to the lower holder of a UTM instrument (LLOYD Instrument, LF plus), the PET film attached to the separator was mounted to the upper holder of the UTM instrument, force was applied thereto at a rate of 300 mm/min with an angle of 180°, and the force required to separate anode from the porous coating layer facing the anode was measured.

4) Method for Determination of Resistance

Each of the separators according to Examples and Comparative Examples was impregnated with an electrolyte and resistance was determined after aging. Herein, the resistance of each separator was determined by using 1 M $LiPF_6$-ethylene carbonate/ethylmethyl carbonate (weight ratio 3:7) as an electrolyte at 25° C. through an alternating current process. Therefore, the resistance determined herein is not the resistance of each secondary battery but the resistance of each separator itself 5) Method for Determination of Air Permeability Each of the lithium secondary batteries according to Examples and Comparative Examples was disassembled again. The air permeability of the resultant separator was determined by using a Gurley type densometer according to JIS P-8117. Herein, the air permeability was measured as time required for 100 mL of air to pass through an area of 645 $mm^2$ with a diameter of 28.6 mm.

6) Method for Determination of Presence of Urethane Crosslinking

The presence of urethane crosslinking in a crosslinked porous coating layer was analyzed by using a proton nuclear magnetic resonance spectroscope ($^1$H NMR) (Model name: NMR-400 (400 MHz, available from JEOL)) and deuterated dimethyl sulfoxide (DMSO-d6, available from Aldrich) as a solvent.

DESCRIPTION OF DRAWING NUMERALS

100: Separator
10: Porous polymer substrate
20: Crosslinked porous coating layer
21: Inorganic particles
22: Binder polymer
23: Urethane crosslinking

What is claimed is:

1. A separator for a lithium secondary battery, comprising:
a porous polymer substrate; and
a crosslinked porous coating layer on at least one surface of the porous polymer substrate,
wherein the crosslinked porous coating layer comprises inorganic particles and a crosslinkable binder polymer crosslinked through urethane crosslinking, wherein the inorganic particles comprise at least one hydroxyl group or surfaces of the inorganic particles are treated with hydroxyl groups, and wherein the crosslinkable binder polymer comprises (i) a homopolymer comprising repeating units of polyvinylidene fluoride-containing monomer comprising at least one acrylate (CH$_2$=CHCOO—) group and (ii) a homopolymer comprising repeating units of an acrylate monomer containing at least one isocyanate (—NCO) group.

2. The separator for the lithium secondary battery according to claim 1, wherein the crosslinkable binder polymer is formed by grafting of a polyvinylidene fluoride-containing polymer with a crosslinking agent comprising repeating units of the acrylate monomer containing at least one isocyanate (NCO) group and a reactive resin comprising the repeating units of acrylate (CH$_2$=CHCOO—) group-containing polyvinylidene fluoride-containing monomer.

3. The separator for the lithium secondary battery according to claim 1, wherein the crosslinkable binder polymer is formed by grafting of a polyvinylidene fluoride-containing polymer, the homopolymer comprising the repeating units of the acrylate group-containing polyvinylidene fluoride monomer on a backbone of the polyvinylidene fluoride-containing polymer, and the homopolymer comprising the repeating units of the isocyanate group-containing acrylate monomer on the backbone of the polyvinylidene fluoride-containing polymer.

4. The separator for the lithium secondary battery according to claim 2, wherein the polyvinylidene fluoride-containing polymer comprises a copolymer of vinylidene difluoride (VDF) as a monomer with at least one comonomer selected from hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluoromethyl vinyl ether (PMVE), perfluoro-2,2-dimethyl-1,3-dioxole (PDD), or perfluoro-2-methylene-4-methyl-1,3-dioxolane (PMD).

5. The separator for the lithium secondary battery according to claim 1, wherein the homopolymer comprising repeating units of the acrylate (CH$_2$=CHCOO—) group-containing polyvinylidene fluoride-containing monomer is represented by the following Chemical Formula 1:

[Chemical Formula 1]

wherein each of n1 and n2 is an integer of 1 or more, and R$_1$ represents a C$_1$-C$_{10}$ alkyl group, a C$_1$-C$_{10}$ alkoxy group, or a C$_1$-C$_{10}$ alkyl group containing at least one double bond.

6. The separator for the lithium secondary battery according to claim 1, wherein the homopolymer comprising repeating units of the isocyanate (—NCO) group-containing acrylate monomer is represented by the following Chemical Formula 2:

[Chemical Formula 2]

wherein each of n3 and n4 is an integer of 1 or more.

7. The separator for the lithium secondary battery according to claim 1, wherein the crosslinkable binder polymer comprises a binder polymer represented by the following Chemical Formula 3:

[Chemical Formula 3]

wherein each of n1, n2, n3 and n4 is an integer of 1 or more, and R$_1$ represents a C$_1$-C$_{10}$ alkyl group, a C$_1$-C$_{10}$ alkoxy group, or a C$_1$-C$_{10}$ alkyl group containing at least one double bond.

8. The separator for the lithium secondary battery according to claim 2, wherein the reactive resin comprising repeating units of the acrylate (CH$_2$=CHCOO—) group-containing polyvinylidene fluoride-containing monomer is derived from at least one selected from ethyl acrylate, butyl acrylate, methyl methacrylate or 2-ethylhexyl acrylate.

9. The separator for the lithium secondary battery according to claim 1, wherein the inorganic particles and the crosslinkable binder polymer are crosslinked by a urethane reaction during an activation of the lithium secondary battery.

10. The separator for the lithium secondary battery according to claim 1, wherein an amount of the isocyanate group is larger than 0 and equal to or less than 100 parts by weight based on 100 parts by weight of the crosslinkable binder polymer.

11. The separator for the lithium secondary battery according to claim 1, wherein the inorganic particles have an average particle diameter (D$_{50}$) of 0.001 μm to 10 μm.

12. A lithium secondary battery, comprising:
a cathode,
an anode, and
a separator interposed between the cathode and the anode, wherein the separator is as defined in claim 1.

13. A method for manufacturing a lithium secondary battery, comprising the steps of:
(S1) preparing a slurry comprising (a) inorganic particles comprising at least one hydroxyl group or inorganic particles surface-treated with hydroxyl groups, (b) a crosslinkable binder polymer which comprises (i) a homopolymer comprising repeating units of a polyvinylidene fluoride-containing monomer containing at least one acrylate ($CH_2$=CHCOO—) group and (ii) a homopolymer comprising repeating units of an acrylate monomer comprising at least one isocyanate (—NCO) group, and (c) a solvent;

(S2) applying the slurry on a porous polymer substrate, followed by drying, to prepare a preliminary separator having a porous coating layer on the porous polymer substrate;

(S3) manufacturing a battery comprising the preliminary separator; and (S4) activating the battery, wherein the inorganic particles and the crosslinkable binder polymer comprising isocyanate and acrylate groups undergo a crosslinking reaction during the activation step to form urethane crosslinking.

14. The method for manufacturing the lithium secondary battery according to claim 13, wherein step (S4) comprises aging the battery at a temperature of 50° C.

15. The method for manufacturing the lithium secondary battery according to claim 13, wherein the crosslinkable binder polymer is formed by grafting of a polyvinylidene fluoride-containing polymer with a crosslinking agent comprising the repeating units of the acrylate monomer containing at least one isocyanate (—NCO) group and a reactive resin comprising the repeating units of acrylate ($CH_2$=CHCOO—) group-containing polyvinylidene fluoride-containing monomer.

16. The separator for the lithium secondary battery according to claim 3, wherein the polyvinylidene fluoride-containing polymer comprises a copolymer of vinylidene difluoride (VDF) as a monomer with at least one comonomer selected from hexafluoropropylene (HFP), chlorotrifluoroethylene (CTFE), hexafluoroisobutylene, perfluorobutyl ethylene, perfluoropropyl vinyl ether (PPVE), perfluoroethyl vinyl ether (PEVE), perfluoromethyl vinyl ether (PMVE), perfluoro-2,2-dimethyl-1,3-dioxole (PDD), or perfluoro-2-methylene-4-methyl-1,3-dioxolane (PMD).

* * * * *